US010336190B2

(12) United States Patent
Yokochi et al.

(10) Patent No.: US 10,336,190 B2
(45) Date of Patent: Jul. 2, 2019

(54) ROAD SIGN INFORMATION DISPLAY SYSTEM AND METHOD IN VEHICLE (71) Applicant: HONDA MOTOR CO., LTD., Tokyo (JP)

(72) Inventors: Yuji Yokochi, Wako (JP); Shinnosuke Saito, Wako (JP); Izumi Tokatsudo, Wako (JP); Tetsuo Ikeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 14/940,372

(22) Filed: Nov. 13, 2015

(65) Prior Publication Data
US 2016/0137127 A1 May 19, 2016

(30) Foreign Application Priority Data

Nov. 17, 2014 (JP) .................. 2014-232333

(51) Int. Cl.
B60K 35/00 (2006.01)
G06K 9/00 (2006.01)
(52) U.S. Cl.
CPC .......... B60K 35/00 (2013.01); G06K 9/00798 (2013.01); B60K 2370/334 (2019.05); G06K 9/00805 (2013.01); G06K 9/00818 (2013.01)
(58) Field of Classification Search
CPC ............ B60K 35/00; B60K 2350/2052; G06K 9/00798; G06K 9/00805; G06K 9/00818
See application file for complete search history.

(56) References Cited

U.S. PATENT DOCUMENTS

2009/0074249 A1* 3/2009 Moed ................ G06K 9/00818
382/104

FOREIGN PATENT DOCUMENTS

| JP | 2010-500585 A | 1/2010 | |
| JP | 2011-242839 A | 12/2011 | |
| JP | 2012-185076 A | 9/2012 | |
| JP | 2012185076 A * | 9/2012 | ......... G08G 1/09623 |

OTHER PUBLICATIONS

Office Action dated Sep. 6, 2016, issued in counterpart Japanese Patent Application No. 2014-232333. (3 pages).

* cited by examiner

Primary Examiner — William C Vaughn, Jr.
Assistant Examiner — Joseph Daniel A Towe
(74) Attorney, Agent, or Firm — Westerman, Hattori, Daniels & Adrian, LLP (57) ABSTRACT In a sign information display system or method, if a road sign is recognized by a sign recognition device, a display control device determines whether or not it will cause a sign information display device to display first sign information, which is information concerning the road sign, on the basis of a driving state of a front vehicle driving in front of the vehicle.

5 Claims, 8 Drawing Sheets

ROAD SIGN INFORMATION DISPLAY SYSTEM AND METHOD IN VEHICLE

CROSS REFERENCES TO RELATED APPLICATIONS

The present application claims priority under 35 U.S.C. § 119 to Japanese Patent Application No. 2014-232333, filed Nov. 17, 2014, entitled "Sign Information Display System and Method." The contents of this application are incorporated herein by reference in their entirety.

BACKGROUND

1. Field

The present disclosure relates to a sign information display system and method for displaying information concerning a road sign for a driving lane in which a driver is driving.

2. Description of the Related Art

Japanese Unexamined Patent Application Publication No. 2011-242839 discloses a driving support system that supports vehicle driving in compliance with traffic regulations, for example, a stop instruction and a no-entry instruction, other than a speed limit instruction ([0006] and Abstract). In this publication, the following configuration is disclosed in the abstract. In a driving support system, an image recognition processor 19 recognizes the contents of regulations, such as a stop instruction and a no-entry instruction, at a location in front of a vehicle, on the basis of an image of a view in front of the vehicle captured by a camera 7, and more specifically, a flashing red light (instruction to stop) and traffic signs such as a no-entry instruction ("do not enter" sign) and a one-way instruction included in this image. The contents of the regulations at different locations are registered as regulation data in advance. A controller 16 detects the occurrence of violations against the traffic regulations by the vehicle on the basis of the recognition results of the image recognition processor 19 and the registered regulation data. Concerning a location at which the vehicle has violated a regulation a certain number of times, when the vehicle is approaching such a location, the controller 16 outputs a voice message instructing the driver to adhere to the regulation.

SUMMARY

The driving support system disclosed in the above-described publication outputs a voice message instructing the driver to adhere to a traffic regulation, assuming that it is possible that the vehicle violate the traffic regulation again. However, even in a case in which the image recognition processor 19 (or the controller 16) has incorrectly recognized the content of a regulation, such a voice message may be output.

The present disclosure has been made in view of the above-described background. The present application describes a sign information display system and method that is capable of providing correct warning information to a driver.

According to an aspect of the present disclosure, there is provided a sign information display system including: a camera that obtains a front image indicating a view in front of a host vehicle; a sign recognition device that recognizes a road sign from the front image; a sign information display device that displays first sign information, which is information concerning the road sign recognized by the sign recognition device; a display control device that controls the sign information display device; and a front vehicle recognition device that recognizes a front vehicle driving in a driving lane in which the host vehicle is driving or in an adjacent driving lane and in a direction in which the host vehicle is driving. In a case in which the road sign is recognized by the sign recognition device, the display control device determines whether or not it will cause the sign information display device to display the first sign information, on the basis of a driving state of the front vehicle.

According to the above-described aspect, if a road sign is recognized, the display control device determines whether or not it will cause the sign information display device to display the first sign information, on the basis of the driving state of a front vehicle. With this operation, the first sign information may be displayed in accordance with the driving state of a front vehicle. For example, in the case of a road sign provided near a junction (intersection), it is sometimes difficult to automatically decide for which driving lane the road sign is provided. If the front vehicle seems to be driving by following the road sign, it is easier to decide for which driving lane the road sign is provided, on the basis of the driving state of the front vehicle. Accordingly, by determining whether or not the first sign information will be displayed on the basis of the driving state of a front vehicle, it is possible to provide correct warning information to a driver.

The road sign may be a stop sign or a no-entry sign. Then, a stop sign or a no-entry sign provided for another driving lane is not mistaken for a road sign provided for the driving lane of the host vehicle.

If a velocity of the front vehicle is higher than a velocity threshold, the display control device may not cause the sign information display device to display the first sign information. Even when a stop sign or a no-entry sign is recognized from the front image, if the velocity of the front vehicle is relatively high, it is less likely that such a sign is provided for the driving lane of the host vehicle. Accordingly, in this case, the display control device does not cause the sign information display device to display the first sign information. In this manner, sign information is not displayed incorrectly.

If a deceleration rate of the front vehicle is lower than a deceleration rate threshold, the display control device may not cause the sign information display device to display the first sign information. Even when a stop sign or a no-entry sign is recognized from the front image, if the deceleration rate of the front vehicle is relatively low, it is less likely that such a sign is provided for the driving lane of the host vehicle. Accordingly, in this case, the display control device does not cause the sign information display device to display the first sign information. In this manner, sign information is not displayed incorrectly.

If a front vehicle driving in the adjacent driving lane and in the direction in which the host vehicle is driving is recognized by the front vehicle recognition device, the display control device may not cause the sign information display device to display the first sign information. If it is determined that the front vehicle driving in the same direction as the host vehicle is driving in the adjacent driving lane, it is likely that the host vehicle is driving in a two (or more)-lane-one-way road. Normally, a two-lane-one-way road is more likely to be a priority road. In a priority road, it is less likely that a stop sign or a no-entry sign is provided for the driving lane of the host vehicle. In this manner, it is possible to reduce the possibility that a stop sign or a no-entry sign will be recognized incorrectly.

Upon detecting that the host vehicle is turning right or left or that the host vehicle is entering a frontage road, the display control device may cause the sign information display device to display the first sign information. With this operation, even in a case in which sign information is not displayed in accordance with the driving state of a front vehicle, if the driving state of the host vehicle is changed, the sign information may be displayed.

The sign information display system may further include: a current position detection device that detects a current position of the host vehicle; and a map database in which map information is stored. The display control device may compare the first sign information based on the front image with second sign information, which is sign information included in the map information and including information concerning the current position, and may cause the sign information display device to display the first sign information or the second sign information on the basis of a comparison result.

With this operation, it is possible to display the first sign information based on the front image or the second sign information included in the map information and including information indicating a current position of the host vehicle by reflecting the comparison result. For example, if a certain road sign was placed quite recently, information concerning this road sign may not be included in the map information yet. Even in this case, the road sign may be recognized by using the front image so as to inform the driver of the presence of the road sign. If the positional precision of information concerning a road sign included in the map information is higher than that included in the front image, information concerning the road sign based on a more precise position may be provided to the driver.

According to an aspect of the present disclosure, there is provided a sign information display method including: an image obtaining step of obtaining a front image indicating a view in front of a host vehicle; a sign recognition step of recognizing a road sign from the front image; a sign information display step of displaying first sign information, which is information concerning the road sign; and a front vehicle recognition step of recognizing a front vehicle driving in a driving lane in which the host vehicle is driving or in an adjacent driving lane and in a direction in which the host vehicle is driving. In the sign information display step, in a case in which the road sign is recognized, it is determined whether or not the first sign information will be displayed on the basis of a driving state of the front vehicle.

In the sign information display step, in a case in which the road sign is a stop sign or a no-entry sign and the road sign is recognized, if a velocity of the front vehicle is not higher than a velocity threshold or if a deceleration rate of the front vehicle is not lower than a deceleration rate threshold, the first sign information may be displayed, and if the velocity of the front vehicle is higher than the velocity threshold or if the deceleration rate of the front vehicle is lower than the deceleration rate threshold, the first sign information may not be displayed.

In the sign information display step, in a case in which the road sign is a stop sign or a no-entry sign and the road sign is recognized, if a front vehicle driving in the adjacent driving lane and in the direction in which the host vehicle is driving is not recognized, the first sign information may be displayed, and if a front vehicle driving in the adjacent driving lane and in the direction in which the host vehicle is driving is recognized, the first sign information may not be displayed.

DESCRIPTION OF THE PREFERRED EMBODIMENTS

A. First Embodiment

A1. Configuration (A1-1. Overall Configuration)

Figure 1:
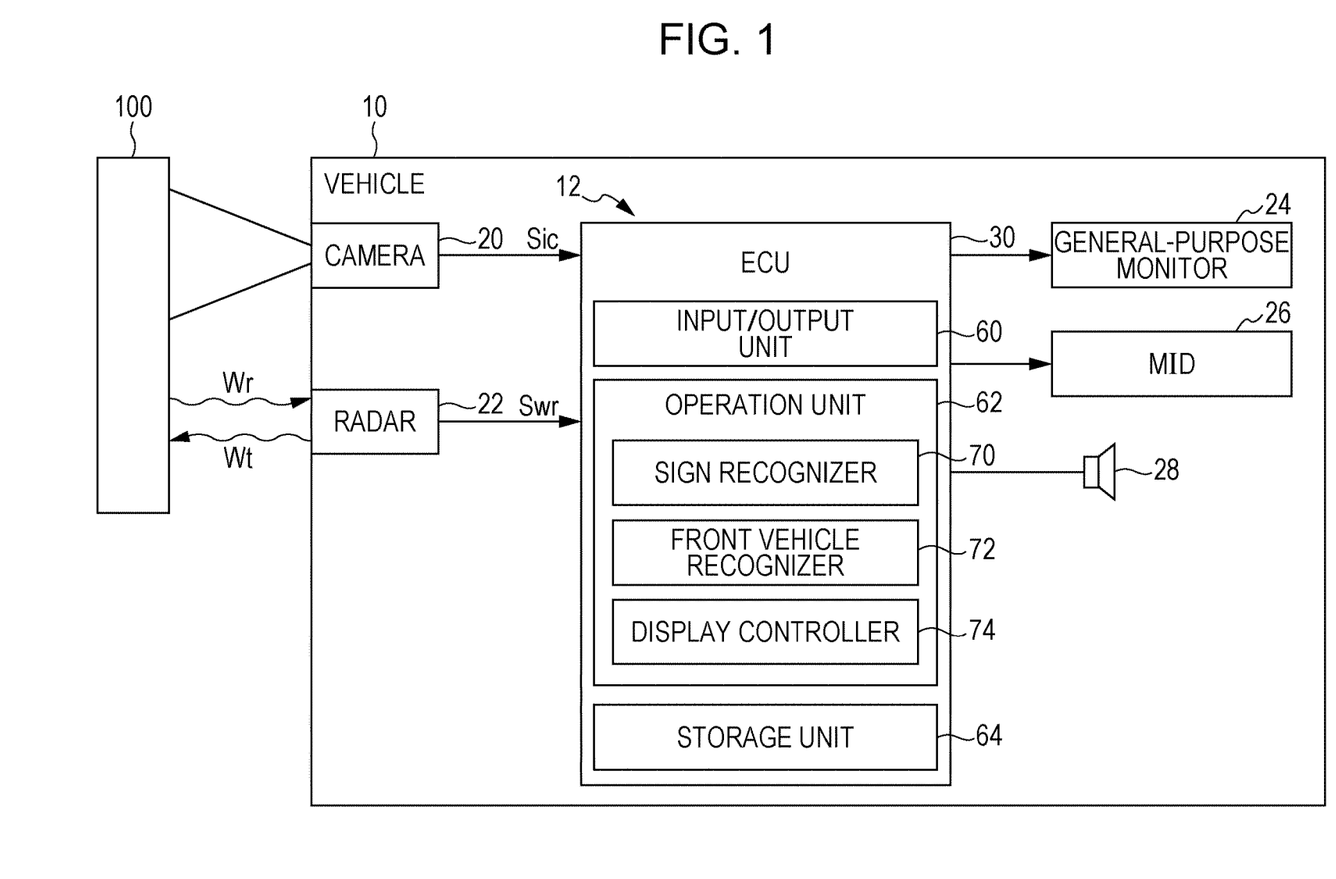
FIG. 1 is a block diagram illustrating the configuration of a vehicle including a sign information display system according to a first embodiment of the present disclosure.
Figure 2:
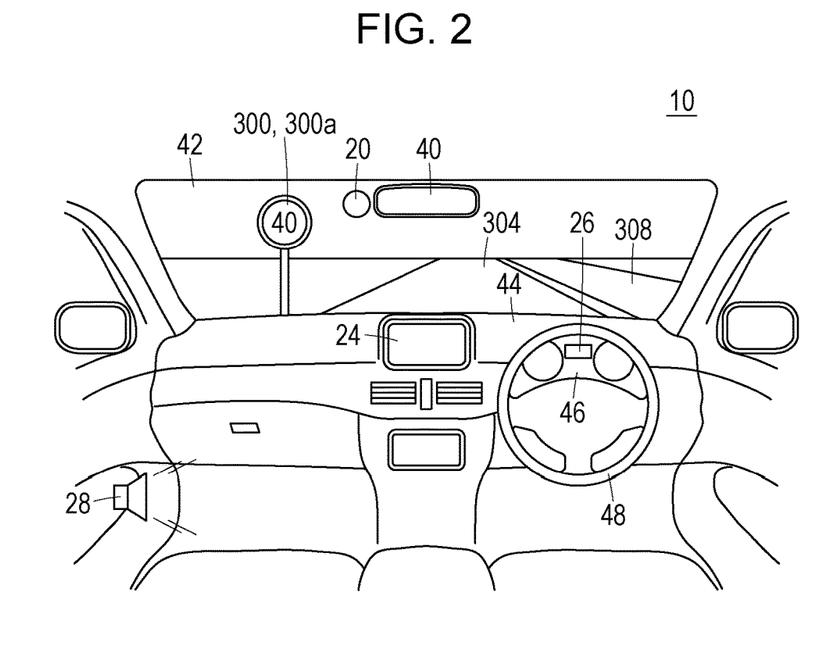
FIG. 2 illustrates the inside of the vehicle and a view seen from the vehicle in the first embodiment.

FIG. 1 is a block diagram illustrating the configuration of a vehicle 10 including a sign information display system 12 (hereinafter also referred to as a "display system 12") according to a first embodiment of the present disclosure. FIG. 2 illustrates the inside of the vehicle 10 and a view seen from the vehicle 10 in the first embodiment. In the first embodiment, it is assumed that the vehicle 10 drives on the left-hand side of the road. The vehicle 10 is a right-hand-drive car, but may be a left-hand-drive car.

The display system 12 includes a front camera 20 (hereinafter also referred to as a "camera 20"), a radar 22, a general-purpose monitor 24, a multi information display 26 (hereinafter referred to as a "MID 26"), a speaker 28, and an electronic control unit 30 (hereinafter referred to as an "ECU 30").

(A1-2. Camera 20)

The camera 20 (imaging device) obtains an image Imc (hereinafter also referred to as a "surrounding image Imc") of a view around the vehicle 10, and outputs a signal corresponding to the image Imc (hereinafter referred to as an "image signal Sic" or a "signal Sic") to the ECU 30. In the first embodiment, the surrounding image Imc is used for recognizing or detecting a road sign 300 (hereinafter also referred to as a "sign 300"), such as that shown in FIG. 2, but may also be used for recognizing or detecting a vehicle 302, such as that shown in FIG. 4, driving in front of the vehicle 10 (hereinafter referred to as a "front vehicle 302"). In the first embodiment, the sign 300 may include so-called road signs and traffic signals provided on the road.

As shown in FIG. 2, the camera 20 is located at the center of the vehicle width in the front portion of the cabin of the vehicle 10 (for example, around a rear-view mirror 40) and captures an image of an area around the vehicle 10 through a front windshield 42. Alternatively, the camera 20 may be located at the center of the vehicle width in the front bumper of the vehicle 10. In the example shown in FIG. 2, the area around the vehicle 10 taken by the camera 20 includes the sign 300, a driving lane 304 of the vehicle 10, and an opposite driving lane 308. The sign 300 shown in FIG. 2 is a sign indicating a speed limit (forty kilometers per hour (km/h) in the example shown in FIG. 2). The sign 300 may also be referred to as a "speed limit sign 300a".

In the first embodiment, the single camera 20 is used. However, a stereo camera formed by using two cameras 20 located on the right and left sides in a symmetrical structure may be used. The camera 20 obtains a surrounding image Imc constituted by fifteen or more frames (for example, thirty frames) per second. In the first embodiment, the camera 20 is a color camera, but may be a monochrome camera or an infrared camera according to the purpose of use.

(A1-3. Radar 22)

The radar 22 emits transmission waves Wt, which are electromagnetic waves (millimeter waves in this example), to the outside of the vehicle 10, and receives reflected waves Wr reflected by and returned from an outside object 100 (for example, the front vehicle 302 shown in FIG. 4) or a pedestrian (not shown). Then, the radar 22 outputs a detection signal indicating the reflected waves Wr (hereinafter referred to as a "reflected wave signal Swr" or a "signal Swr") to the ECU 30. In the first embodiment, the ECU 30 detects the front vehicle 302 (another vehicle) by only using the reflected waves Swr. However, in addition to or instead of the reflected waves Swr, the ECU 30 may recognize or detect the front vehicle 302 by using the surrounding image Imc.

The radar 22 is disposed at the front side (for example, a front bumper and/or a front grille) of the vehicle 10. In addition to or instead of the front side, the radar 22 may be disposed at the rear side (for example, a rear bumper and/or a rear grille) or the side portion (for example, the side of a front bumper) of the vehicle 10.

Instead of the radar 22 that outputs millimeter waves, a laser radar or a sensor, such as an ultrasonic sensor, may be used. This will be discussed later.

(A1-4. General-Purpose Monitor 24)

The general-purpose monitor 24 may be used as a display unit of a device (not shown), such as an audio device, disposed within the vehicle 10.

(A1-5. MID 26)

The MID 26 is a simple display device (icon display device) that visualizes and displays accompanying information for the driving of the vehicle 10. In the first embodiment, the MID 26 displays information concerning a sign 300 (hereinafter referred to as "sign information Is"). The MID 26 is a display module which is simpler in structure and inexpensive than the general-purpose monitor 24, particularly, a display panel thereof. For example, a display panel having a low resolution than the general-purpose monitor 24 (such as a non-interlace type panel) may be used as the MID 26.

As shown in FIG. 2, the MID 26 is disposed on a dashboard 44 near and above an instrument panel 46 or within the instrument panel 46. The MID 26 is located at a position at which a driver is able to see the MID 26 through the upper hollow portion of a steering wheel 48. Then, the driver is able to see the MID 26 without looking away from the front side of the vehicle 10. The position of the MID 26 is not restricted to the above-described locations. The sign information Is may be displayed on the general-purpose monitor 24 instead of on the MID 26.

Figure 3:
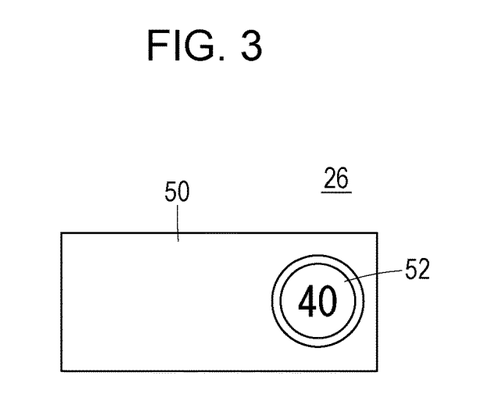
FIG. 3 illustrates a display example of a multi information display (MID) in the first embodiment.

FIG. 3 illustrates a display example of the MID 26 in the first embodiment. As shown in FIG. 3, a horizontally elongated rectangular display area 50 is provided on the MID 26. In the right-side portion of the display area 50, a sign icon 52 simulating a mark of the sign 300 (speed limit sign 300a in this example) is displayed. Another sign icon 52 (such as a sign icon 52 simulating a mark of a stop sign 300b or a no-entry sign 300c, which will be discussed later) may be displayed in the remaining portion of the display area 50. On the MID 26, in addition to at least one sign icon 52, which is not restricted to the speed limit sign 300a, the mileage, current time, and information concerning the instrument panel 46 may be displayed.

(A1-6. ECU 30)

The ECU 30 controls the entirety of the display system 12, and includes an input/output unit 60, an operation unit 62, and a storage unit 64, as shown in FIG. 1.

The image signal Sic output from the camera 20 and the reflected wave signal Swr output from the radar 22 are supplied to the ECU 30 via the input/output unit 60. The input/output unit 60 includes an analog-to-digital (A/D) conversion circuit (not shown) that converts an input analog signal into a digital signal.

The operation unit 62 performs operations based on the signals Sic and Swr supplied from the camera 20 and the radar 22, respectively, and generates a signal to be output to the MID 26 on the basis of the operation results.

As shown in FIG. 1, the operation unit 62 includes a sign recognizer 70 (hereinafter also referred to as a "recognizer 70"), a front vehicle recognizer 72 (hereinafter also referred to as a "recognizer 72"), and a display controller 74 (hereinafter also referred to as a "controller 74"). The recognizers 70 and 72 and the controller 74 are implemented by executing a program stored in the storage unit 64. This program may be supplied from an external source via a wireless communication device (including cellular phones and smartphones). Part of the program may be constituted by hardware (circuit component).

The sign recognizer 70 recognizes the sign 300 on the basis of the image signal Sic supplied from the camera 20. The front vehicle recognizer 72 recognizes the front vehicle 302 on the basis of the reflected waves Wr (reflected wave signal Swr) detected by the radar 22. In the first embodiment, the front vehicle 302 includes a right-in-front vehicle 302a (see FIGS. 4 and 8), which is driving in the same driving lane 304 as the vehicle 10 in front of (right in front of) the vehicle 10 and a diagonally front vehicle 302b (see FIGS. 5 and 8), which is driving in a driving lane 306 adjacent to the driving lane 304 of the vehicle 10 (hereinafter referred to as an "adjacent driving lane 306") in front of (at the right or left front side of) the vehicle 10. Strictly speaking, when the vehicle 10 and the front vehicle 302 are driving along a curve, the right-in-front vehicle 302a may not be positioned exactly right in front of the vehicle 10, but it will still be called the right-in-front vehicle 302a.

The display controller 74 controls the display of the sign icon 52 on the MID 26 on the basis of the recognition results of the sign recognizer 70 and the front vehicle recognizer 72. Details of the display control operation of the display controller 74 will be discussed later with reference to FIG. 6.

A2. Sign Information Display Control (A2-1. Basic Concept of Sign Information Display Control of First Embodiment)

Figure 4:
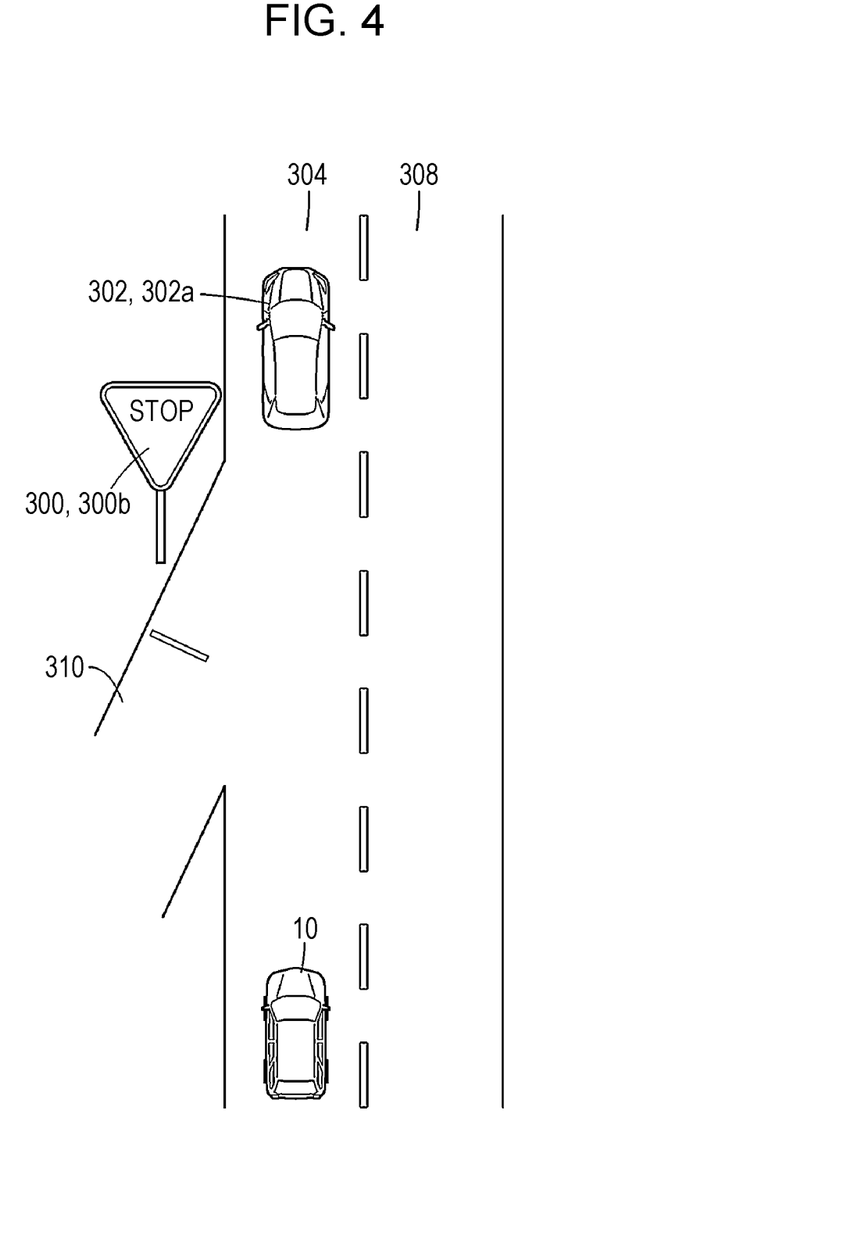
FIG. 4 illustrates a first example of a scene to which a sign information display control operation of the first embodiment is applied.
Figure 5:
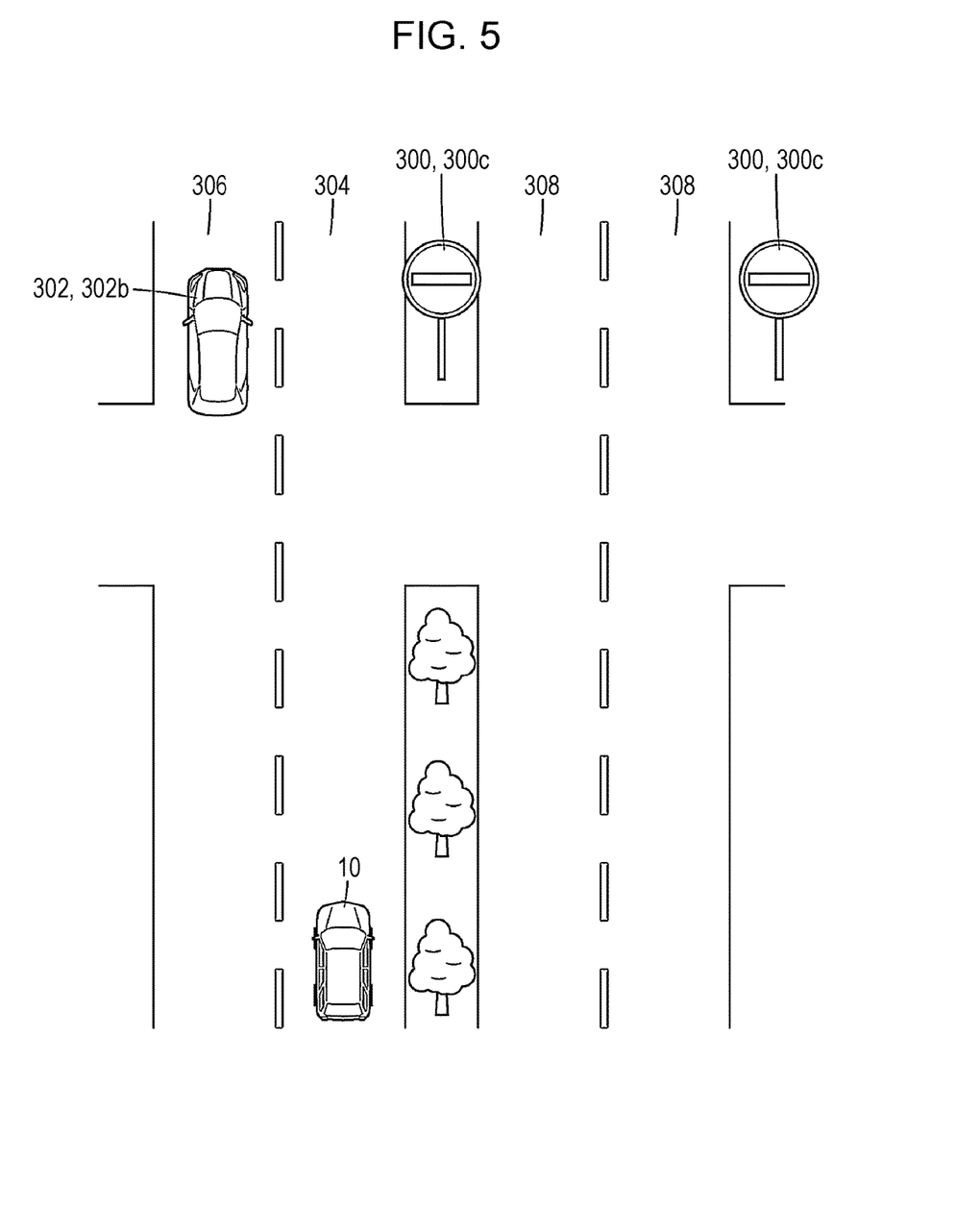
FIG. 5 illustrates a second example of a scene to which a sign information display control operation of the first embodiment is applied.

FIGS. 4 and 5 illustrate first and second examples of scenes to which the sign information display control operation of the first embodiment is applied.

In the first example shown in FIG. 4, there is a front vehicle 302 (right-in-front vehicle 302*a*), which is driving in front of the vehicle 10 in the same driving lane 304. There are no other vehicles in the opposite driving lane 308 to the driving lane 304. In front of the vehicle 10, the driving lane 304 merges with another driving lane 310. In the driving lane 310, a road sign 300 (also referred to as a "stop sign 300*b*") instructing a driver to stop before entering the driving lane 304 is provided. If the sign recognizer 70 of the ECU 30 recognizes the stop sign 300*b* shown in FIG. 4 and mistakes it for a sign 300 for the vehicle 10, the ECU 30 causes the MID 26 to display a sign icon 52 simulating a mark of the stop sign 300*b* even though the driver does not actually have to stop.

In the second example shown in FIG. 5, there is a front vehicle 302 (diagonally front vehicle 302*b*), which is driving in front of the vehicle 10 in the adjacent driving lane 306. In front of the vehicle 10, a road sign 300 (also referred to as a "no-entry sign 300*c*") instructing a driver not to enter the opposite lane 308 is provided. If the sign recognizer 70 of the ECU 30 recognizes the no-entry sign 300*c* shown in FIG. 5 and mistakes it for a sign 300 for the vehicle 10 (driving lane 304), the ECU 30 causes the MID 26 to display a sign icon 52 simulating a mark of the no-entry sign 300*c* even though the driver does not actually have to stop.

In the sign information display control operation of the first embodiment, by considering scenes such as those shown in FIGS. 4 and 5, with the use of information concerning the state of a front vehicle 302, the sign recognizer 70 of the ECU 30 does not recognize a sign 300 incorrectly, and thus, a sign icon 52 based on the incorrect recognition result is not displayed. Details of the sign information display control operation will be discussed below with reference to FIG. 6.

(A2-2. Overall Flow of Sign Information Display Control)

Figure 6:
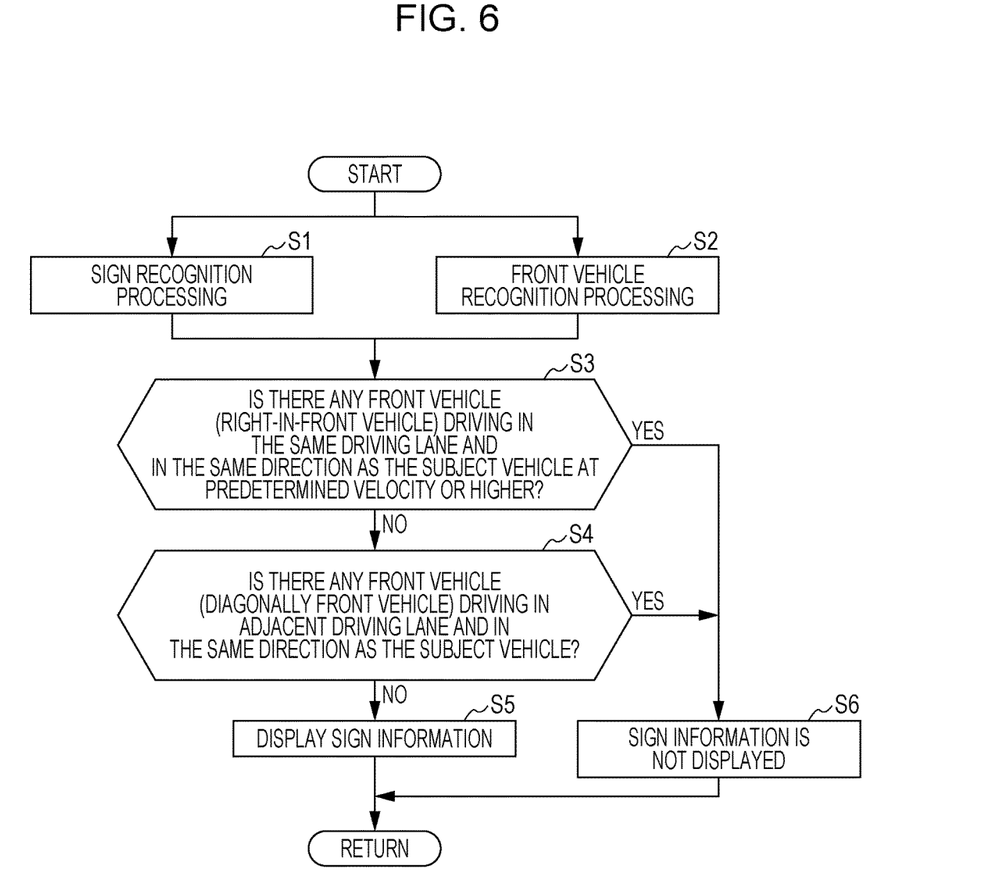
FIG. 6 is a flowchart illustrating sign information display control processing of the first embodiment.

FIG. 6 is a flowchart illustrating sign information display control processing of the first embodiment. This processing is executed by the operation unit 62 (recognizers 70 and 72 and controller 74) of the ECU 30. Among steps S1 through S6 of FIG. 6, step S1 is executed by the sign recognizer 70, step S2 is executed by the front vehicle recognizer 72, and steps S3 through S6 are executed by the display controller 74. The ECU 30 repeatedly executes the processing shown in FIG. 6 at predetermined operation intervals (intervals of several microseconds to several hundreds of milliseconds).

In step S1, the ECU 30 executes sign recognition processing for recognizing a sign 300 on the basis of an image signal Sic (surrounding image Imc) supplied from the camera 20. In step S2, the ECU 30 executes front vehicle recognition processing for recognizing a front vehicle 302 as an outside object 100 on the basis of a reflected wave signal Swr supplied from the radar 22.

In step S3, the ECU 30 determines whether or not there is a front vehicle 302 (right-in-front vehicle 302*a*), which is driving in the same driving lane 304 as the vehicle 10 and in the same direction as the vehicle 10 at a predetermined velocity Vref or higher. The velocity Va of the front vehicle 302 may be calculated on the basis of a change in the positions of the front vehicle 302 specified by the reflected wave signal Swr.

The predetermined velocity Vref is a velocity threshold for determining whether or not the front vehicle 302 is decelerating. The predetermined velocity Vref may be a value obtained by multiplying the speed limit in the driving lane 304 or the velocity V of the vehicle 10 by a predetermined coefficient (for example, 0.6 to 0.9). Alternatively, the predetermined velocity Vref may be a value obtained by subtracting a predetermined value (for example, 10 to 20 km/h) from the speed limit in the driving lane 304. The velocity V of the vehicle 10 may be detected by a velocity sensor (not shown). If it is determined in step S3 that there is no front vehicle 302 (right-in-front vehicle 302*a*) driving at the predetermined velocity Vref or higher, the process proceeds to step S4.

In step S4, the ECU 30 determines whether or not there is a front vehicle 302 (diagonally front vehicle 302*b*), which is driving in the adjacent driving lane 306 and in the same direction as the vehicle 10. If it is determined in step S4 that there is no such a front vehicle 302, the process proceeds to step S5. In step S5, the ECU 30 causes the MID 26 to display a sign icon 52 (sign information Is) so as to provide the sign information Is to the driver. If the sign 300 is a stop sign 300*b* (FIG. 4) or a no-entry sign 300*c* (FIG. 5), the ECU 30 (display controller 74) may output a warning sound (beeping sound or voice informing the driver of the content of the sign 300*b* or 300*c*) from the speaker 28. If no sign 300 has been recognized in the sign recognition processing in step S1, the ECU 30 does not cause the MID 26 to display a sign icon 52.

If it is determined in step S3 that there is a front vehicle 302 (right-in-front vehicle 302*a*) driving at the predetermined velocity Vref or higher, or if it is determined in step S4 that there is a front vehicle 302 (diagonally front vehicle 302*b*), the process proceeds to step S6. In step S6, the ECU 30 does not cause the MID 26 to display a sign icon 52 (sign information Is) corresponding to the sign 300 recognized in the sign recognition processing in step S1 (non-display state). Accordingly, sign information Is is not provided to the driver. In this case, "non-display state" also means that a sign icon 52 is displayed at a brightness level that does not attract the driver's attention.

(A2-3. Sign Recognition Processing (S1 of FIG. 6))

The sign recognition processing will be discussed in detail. As stated above, the sign recognizer 70 recognizes a sign 300 on the basis of an image signal Sic output from the camera 20. For example, the sign recognizer 70 registers patterns (sign patterns) of a sign 300 in the storage unit 64 in advance, and determines whether or not an image that matches one of the registered sign patterns is included in the surrounding image Imc (pattern matching). In this case, multiple sign patterns may be registered according to the type of sign 300. Then, if an image that matches one of the sign patterns is found in the surrounding image Imc, the sign recognizer 70 determines that the sign 300 corresponding to the matched sign pattern is present.

(A2-4. Front Vehicle Recognition Processing (S2 of FIG. 6))

The front vehicle recognition processing will be discussed in detail. As stated above, the front vehicle recognizer 72 recognizes a front vehicle 302 on the basis of reflected waves Wr (reflected wave signal Swr) detected by the radar 22. For example, the front vehicle recognizer 72 detects an outside object 100 around the vehicle 10 on the basis of the reflected wave signal Swr. The front vehicle recognizer 72 then extracts an object having the characteristics of a vehicle from the outside object 100 as the front vehicle 302.

The image signal Sic output from the camera 20 may be used for detecting the outside object 100 and extracting the front vehicle 302. In this case, the detection of the outside object 100 and the extraction of the front vehicle 302 may be performed only with the use of the image signal Sic or with a combination of the reflected wave signal Swr and the image signal Sic.

As discussed above, the front vehicle 302 recognized by the front vehicle recognizer 72 includes a right-in-front vehicle 302a and a diagonally front vehicle 302b. The front vehicle recognizer 72 determines whether the front vehicle 302 is a right-in-front vehicle 302a or a diagonally front vehicle 302b, for example, on the basis of the driving path of the vehicle 10.

For example, the front vehicle recognizer 72 calculates the driving path of the vehicle 10 on the basis of the velocity V [km/hour] of the vehicle 10 and the steering angle θ [degrees] of the steering wheel 48. Then, on the basis of the distance from the front vehicle 302 to the driving path of the vehicle 10, the front vehicle recognizer 72 determines whether the front vehicle 302 is driving in the driving lane 304 or the adjacent driving lane 306. Alternatively, the front vehicle recognizer 72 may detect the driving lane 304 and the adjacent driving lane 306 on the basis of the image signal Sic output from the camera 20 and determine whether the front vehicle 302 is driving in the driving lane 304 or the adjacent driving lane 306 on the basis of the detection results. As stated above, in a strict sense, when the vehicle 10 and the front vehicle 302 are driving along a curve, the right-in-front vehicle 302a may not be positioned right in front of the vehicle 10.

A3. Advantages of First Embodiment

As described above, in the first embodiment, if a sign 300 is recognized, it is determined whether or not the ECU 30 will cause the MID 26 (sign information display device) to display a sign icon 52 (sign information Is as first sign information), on the basis of the driving state of a front vehicle 302 (FIG. 6). That is, the display state and the non-display state of a sign icon 52 are switched according to the driving state of the front vehicle 302. With this operation, a sign icon 52 can be displayed in accordance with the driving state of the front vehicle 302. For example, in the case of a road sign 300 provided near a junction (intersection), it is sometimes difficult to automatically decide for which driving lane the road sign 300 is provided (see FIGS. 4 and 5). If the front vehicle 302 seems to be driving by following the road sign 300, it is easier to decide for which driving lane the road sign 300 is provided, on the basis of the driving state of the front vehicle 302. Accordingly, by determining whether or not a sign icon 52 will be displayed on the basis of the driving state of a front vehicle 302, it is possible to provide correct warning information to a driver.

In the first embodiment, the road sign 300 may be a stop sign 300b or a no-entry sign 300c (see FIGS. 4 and 5). Then, a stop sign 300b or a no-entry sign 300c provided for a driving lane (opposite driving lane 308 or another driving lane 310) other than the driving lane 304 of the vehicle 10 is not mistaken for a road sign 300 provided for the driving lane 304 of the vehicle 10.

In the first embodiment, if the velocity Va of the front vehicle 302 is equal to or higher than the predetermined velocity Vref (velocity threshold) (YES in step S3 of FIG. 6), the display controller 74 (display control device) does not cause the MID 26 to display a sign icon 52 (sign information Is) (step S6). Even when a stop sign 300b or a no-entry sign 300c is recognized from the surrounding image Imc (front image), if the velocity Va of the front vehicle 302 is relatively high, it is less likely that the sign 300b or 300c is provided for the driving lane 304 of the vehicle 10. Accordingly, in this case, the display controller 74 does not cause the MID 26 to display the sign icon 52. In this manner, the sign icon 52 is not displayed incorrectly.

In the first embodiment, if the front vehicle recognizer 72 (front vehicle recognition device) has recognized a front vehicle 302 (diagonally front vehicle 302b) driving in the adjacent driving lane 306 (FIG. 5) in the same direction as the vehicle 10 (YES in step S4 of FIG. 6), the display controller 74 does not cause the MID 26 to display the sign icon 52 (step S6). If it is determined that the front vehicle 302 driving in the same direction as the vehicle 10 is driving in the adjacent driving lane 306 (that is, the front vehicle 302 is a diagonally front vehicle 302b), it is likely that the vehicle 10 is driving in a two (or more)-lane-one-way road. Normally, a two-lane-one-way road is more likely to be a priority road (where a road sign 300 is provided and a driver is not obliged to speed down when entering a junction (intersection) where no traffic control is conducted). In a priority road, it is less likely that a stop sign 300b or a no-entry sign 300c is provided for the driving lane 304. Thus, in the first embodiment, it is possible to reduce the possibility that the stop sign 300b or the no-entry sign 300c will be recognized incorrectly.

B. Second Embodiment

B1. Configuration (B1-1. Overall Configuration)

Figure 7:
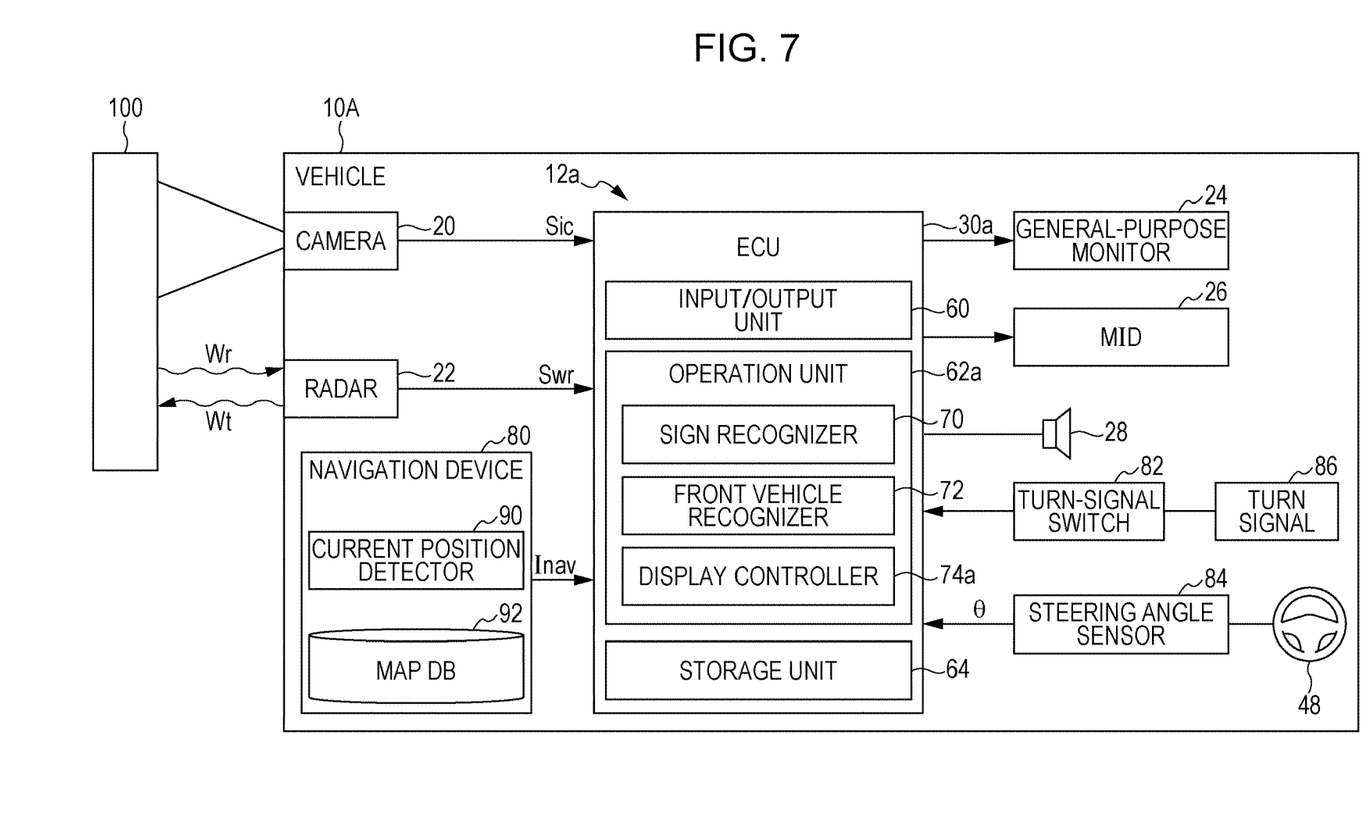
FIG. 7 is a block diagram illustrating the configuration of a vehicle including a sign information display system according to a second embodiment of the present disclosure.

FIG. 7 is a block diagram illustrating the configuration of a vehicle 10A including a sign information display system 12a (hereinafter also referred to as a "display system 12a") according to a second embodiment of the present disclosure. Among the elements of the second embodiment, elements similar to those of the first embodiment are designated by like reference numerals, and a detailed explanation thereof will thus be omitted.

In comparison with the display system 12 of the first embodiment, in the display system 12a of the second embodiment, it is possible to determine in a more detailed manner whether or not a sign icon 52 as sign information Is will be displayed. As shown in FIG. 7, the vehicle 10A includes a navigation device 80, a turn-signal switch 82, and a steering angle sensor 84. A display controller 74a (hereinafter also referred to as a "controller 74a") of an operation unit 62a of an electronic control unit 30a (hereinafter referred to as an "ECU 30a") uses outputs from the navigation device 80, the turn-signal switch 82, and the steering angle sensor 84 as the conditions for determining whether or not a sign icon 52 will be displayed. Details of this operation will be described later with reference to FIGS. 8 and 9.

(B1-2. Navigation Device 80)

The navigation device 80 is used for aiding a driver in finding a driving route, and includes a current position detector 90 and a map database 92 (hereinafter referred to as a "map DB 92"). The current position detector 90 detects a current position Pc of the vehicle 10A by using, for example, a global positioning system (GPS). The map DB 92 stores map information Im used for assisting a driver in finding a driving route.

The navigation device 80 supplies the current position Pc and the map information Im to the ECU 30a in response to a request from the ECU 30a. Alternatively, the navigation device 80 may supply the current position Pc and the map information Im to the ECU 30a at a predetermined timing without a request from the ECU 30a. The predetermined timing may be at least one of a time point at which the navigation device 80 is turned ON, a time point at which the current position Pc indicates a position at which the vehicle 10A has travelled by a predetermined distance, and a time point after the lapse of specific duration (fixed duration) (for example, several seconds to several tens of seconds).

(B1-3. Turn-Signal Switch 82)

The turn-signal switch 82 switches between ON and OFF states of a turn signal (direction indicator) 86.

(B1-4. Steering Angle Sensor 84)

The steering angle sensor 84 detects the steering angle θ of the steering wheel 48 and informs the ECU 30a of the detected steering angle θ.

B2. Sign Information Display Control

B2-1. Basic Concept of Sign Information Display Control of Second Embodiment

Figure 8:
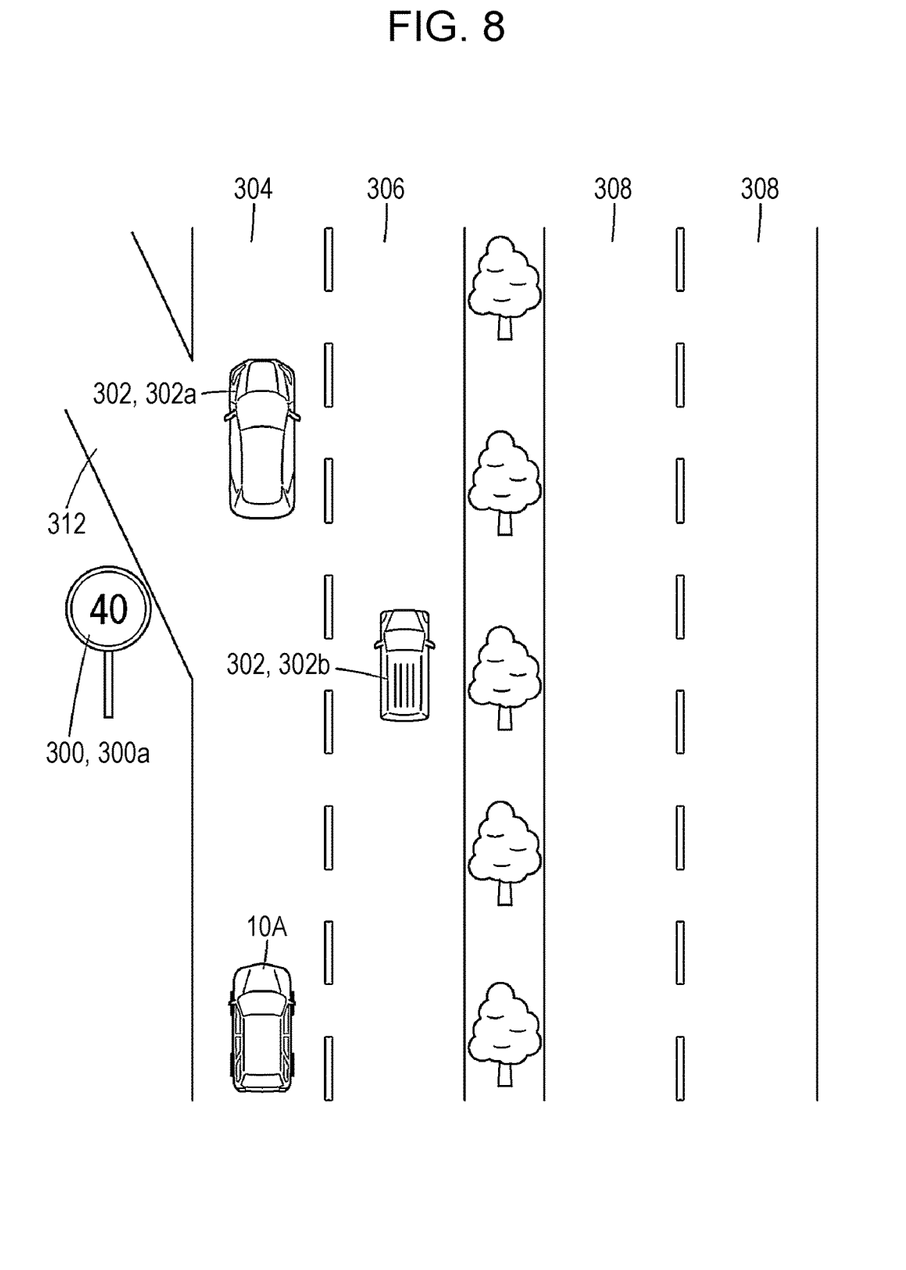
FIG. 8 illustrates an example of a scene to which a sign information display control operation of the second embodiment is applied.

FIG. 8 illustrates an example of a scene to which the sign information display control operation of the second embodiment is applied. In the example shown in FIG. 8, the vehicle 10A is driving in a highway, and both of a right-in-front vehicle 302a driving at the predetermined velocity Vref or higher and a diagonally front vehicle 302b are present. The driver of the vehicle 10A intends to enter a frontage road (service road) 312 toward the left front of the current driving lane 304.

In the sign information display control operation of the first embodiment, if there is a right-in-front vehicle 302a driving at the predetermined velocity Vref or higher (YES in step S3 of FIG. 6) or if there is a diagonally front vehicle 302b (YES in step S4 of FIG. 6), the ECU 30 does not cause the MID 26 to display a sign icon 52 (sign information Is) (step S6).

However, if the vehicle 10 is entering the frontage road 312, such as in the scene shown in FIG. 8, it is preferable that a sign icon 52 corresponding to the sign 300 be displayed. Accordingly, in the sign information display control operation of the second embodiment, by considering such a scene, a sign icon 52 is displayed even in a case in which there is a front vehicle 302 ahead. This will be discussed in detail below with reference to FIG. 9.

In the second embodiment, one of sign information Is based on a surrounding image Imc and sign information Is based on navigation information Inav is selected and is displayed on the MID 26. The navigation information Inav includes information concerning the current position Pc of the vehicle 10A and information concerning a sign 300 (hereinafter referred to as "sign information Is"). Hereinafter, the sign information Is based on a surrounding image Imc will also be referred to as "first sign information Is1", and the sign information Is based on navigation information Inav will also be referred to as "second sign information Is2".

(B2-2. Overall Flow of Sign Information Display Control)

Figure 9:
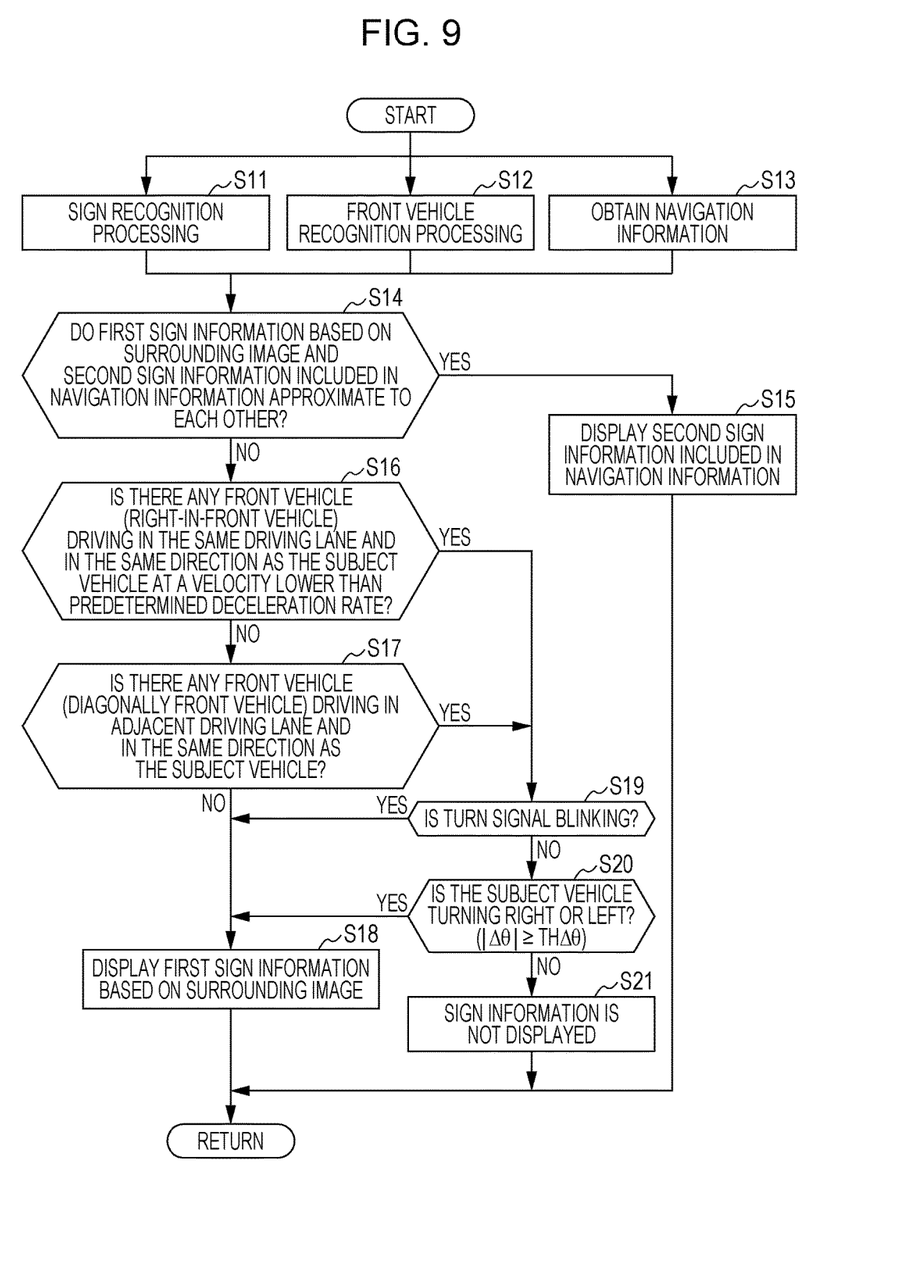
FIG. 9 is a flowchart illustrating sign information display control processing of the second embodiment.

FIG. 9 is a flowchart illustrating sign information display control processing of the second embodiment. This processing is executed by the operation unit 62a (recognizers 70 and 72 and controller 74a) of the ECU 30a. Among steps S11 through S21 of FIG. 9, step S11 is executed by the sign recognizer 70, step S12 is executed by the front vehicle recognizer 72, and steps S13 through S21 are executed by the display controller 74a. The ECU 30a repeatedly executes the processing shown in FIG. 9 at predetermined operation intervals (intervals of several microseconds to several hundreds of milliseconds).

Steps S11 and S12 are similar to steps S1 and S2, respectively, of FIG. 6.

In step S13, the ECU 30a obtains navigation information Inav from the navigation device 80. As stated above, the navigation information Inav includes information concerning the current position Pc of the vehicle 10A and the second sign information Is2.

In step S14, the ECU 30a determines whether or not the first sign information Is1 based on the surrounding image Imc and the second sign information Is2 included in the navigation information Inav approximate to each other. In this case, "approximate to each other" means that the first sign information Is1 and the second sign information Is2 resemble each other to such a degree as to determine that they are concerned with the same sign 300. If it is determined in step S14 that the first sign information Is1 and the second sign information Is2 approximate to each other (YES in step S14), the process proceeds to step S15. In step S15, the ECU 30a displays the second sign information Is2 included in the navigation information Inav as a sign icon 52. Alternatively, the ECU 30a may display the first sign information Is1 based on the surrounding image Imc as a sign icon 52. If it is determined in step S14 that the first sign information Is1 and the second sign information Is2 do not approximate to each other (NO in step S14), the process proceeds to step S16.

In step S16, the ECU 30a determines whether or not there is a front vehicle 302 (right-in-front vehicle 302a) driving in the same driving lane 304 and in the same direction as the vehicle 10A at a velocity lower than a predetermined deceleration rate Dref. The deceleration rate Da [km/h/s] of the front vehicle 302 may be calculated on the basis of the velocity Va of the front vehicle 302.

The predetermined deceleration rate Dref is a deceleration rate threshold for determining whether or not the front vehicle 302 is decelerating, and may be a value from 5 to 20 km/h/s. If it is determined in step S16 that there is no such a front vehicle 302, the process proceeds to step S17. Step S17 is similar to step S4 of FIG. 6. That is, in step S17, it is determined whether or not there is a diagonally front vehicle 302b.

If it is determined in step S16 that there is no right-in-front vehicle 302a driving at a velocity lower than the predetermined deceleration rate Dref, and if it is determined in step S17 that there is no diagonally front vehicle 302b, the process proceeds to step S18. In step S18, the ECU 30a causes the MID 26 to display a sign icon 52 as the sign information Is (first sign information Is1) based on the surrounding image Imc.

If it is determined in step S16 that there is a right-in-front vehicle 302a driving at a velocity lower than the predetermined deceleration rate Dref, or if it is determined in step S17 that there is a diagonally front vehicle 302b, the process proceeds to step S19. In step S19, the ECU 30a determines whether or not the turn signal 86 is blinking. This determination is made on the basis of output from the turn-signal switch 82. If it is determined in step S19 that the turn signal 86 is blinking, the process proceeds to step S18 in which the ECU 30a causes the MID 26 to display a sign icon 52 as the sign information Is (first sign information Is1) based on the surrounding image Imc. With this operation, a scene, such as that shown in FIG. 8, can also be handled appropriately.

If it is determined in step S19 that the turn signal is not blinking, the process proceeds to step S20. In step S20, the ECU 30a determines whether or not the vehicle 10A is turning right or left. This determination is made based on whether or not the absolute value of a change Δθ in the steering angle θ per unit time (hereinafter also referred to as the "steering angular velocity Δθ") is equal to or higher than a steering angular velocity threshold THΔθ. The steering angular velocity threshold THΔθ is a threshold for determining whether or not the vehicle 10A is turning right or left (in other words, whether the vehicle 10A is changing driving lanes).

If it is determined in step S20 that the vehicle 10A is turning right or left, the process proceeds to step S18 in which the ECU 30a causes the MID 26 to display a sign icon 52 as the sign information Is (first sign information Is1) based on the surrounding image Imc. With this operation, it is also possible to appropriately handle a scene in which the vehicle 10A is turning right or left without blinking (or turning ON) the turn signal 86.

If it is determined in step S20 that the vehicle 10A is not turning right or left, the process proceeds to step S21. In step S21, the ECU 30a does not cause the MID 26 to display a sign icon 52.

B3. Advantages of Second Embodiment

In the second embodiment, in addition to or instead of the advantages of the first embodiment, the following advantages are obtained.

In the second embodiment, the display controller 74a (display control device) of the ECU 30a causes the MID 26 (sign information display device) to display a sign icon 52 (first sign information Is) (step S18) when it is detected that the vehicle 10A is turning right or left (YES in step S19) or that the vehicle 10A is entering the frontage road (service road) 312 (YES in step S20). With this operation, even in a case in which sign information Is is not displayed in accordance with the driving state of a front vehicle 302, if the driving state of the vehicle 10A is changed, the sign information Is may be displayed.

In the second embodiment, the display system 12a includes the current position detector 90 (current position detection device) for detecting the current position Pc of the vehicle 10A and the map DB 92 in which map information Im is stored (FIG. 7). The display controller 74a compares first sign information Is1 based on a surrounding image Imc (front image) with second sign information Is2, which is sign information included in the map information Im and including information concerning the current position Pc (step S14 of FIG. 9). The display controller 74a then causes the MID 26 to display the first sign information Is1 or the second sign information Is2 on the basis of the comparison result (steps S15 and S18).

With this operation, it is possible to display the first sign information Is1 or the second sign information Is2 by reflecting the result of comparing the first sign information Is1 with the second sign information Is2. For example, if a certain road sign 300 was placed quite recently, information concerning this road sign 300 may not be included in the map information Im yet. Even in this case, the road sign 300 may be recognized by using a surrounding image Imc so as to inform the driver of the presence of the road sign 300. If the positional precision of information concerning a road sign 300 included in the map information Im is higher than that included in a surrounding image Imc, information concerning the road sign 300 based on a more precise position may be provided to the driver.

C. Modified Examples

The present disclosure is not restricted to the above-described embodiments. Various modifications may be made on the basis of the description in this specification. For example, the following modifications and configurations may be employed.

[C1. Application Range]

In the above-described embodiments, the display systems 12 and 12a are applied to the vehicles 10 and 10A (FIGS. 1 and 7). However, the application range of the display systems 12 and 12a is not restricted to vehicles. For example, the display systems 12 and 12a may be used in moving objects, such as ships and airplanes. Additionally, instead of being disposed within the vehicles 10 and 10A (moving objects), the display systems 12 and 12a may be disposed outside of the vehicles 10 and 10A, for example, in a roadside device, such as a radio beacon. In this case, communication may be performed between the vehicles 10 and 10A and the display systems 12 and 12a, and recognition results of the display systems 12 and 12a may be transmitted to the vehicles 10 and 10A.

[C2. Configuration of Display Systems 12 and 12a]

In the above-described embodiments, the MID 26 is used for displaying output (sign icon 52) from the display systems 12 and 12a (FIG. 3, step S5 of FIG. 6, and steps S15 and S18 of FIG. 9), but another element may be used. For example, the general-purpose monitor 24 may be used for displaying output (sign icon 52) from the display systems 12 and 12a. Depending on the display capability of the MID 26, the general-purpose monitor 24 may be omitted.

In the above-described embodiments, the radar 22 that emits transmission waves Wt (millimeter waves) and receives reflected waves Wr (millimeter waves) is used. However, another element may be used as long as it is capable of detecting an outside object 100 by using transmission waves Wt and reflected waves Wr (electromagnetic waves). For example, a laser radar or a sensor, such as an ultrasonic sensor, may be used.

In the second embodiment, the second sign information Is2 used by the display controller 74a is information stored in the map DB 92 of the navigation device 80 (see FIG. 7). However, since the second sign information Is2 is used as a result of being compared with the first sign information Is1 based on a surrounding image Imc, it does not have to be obtained from the navigation device 80. For example, the map DB 92 may be disposed, not in the navigation device 80 that assists a driver in finding a driving route, but in a device that provides map information Im instead of a driving route (map positioning unit (MPU)), and the second sign information Is2 may be provided from the map DB 92 of the MPU to the display controller 74a. Alternatively, the current position Pc may be supplied to a server via an external communication device (not shown), and second sign information Is2 including information concerning the current position Pc may be obtained from the server and be used in the display controller 74a.

[C3. Control by ECUs 30 and 30a]

(C3-1. Driving State of Front Vehicle 302)

In the first embodiment, it is determined whether or not a right-in-front vehicle 302a is driving at the predetermined velocity Vref or higher (step S3 of FIG. 6). In the second embodiment, it is determined whether or not a right-in-front vehicle 302a is driving at a velocity lower than the predetermined deceleration rate Dref (step S16 of FIG. 9). However, it may be determined from another point of view whether or not a right-in-front vehicle 302a is decelerating to stop. For example, it may be determined whether or not a brake light of a right-in-front vehicle 302a is ON, or whether or not the absolute value of the rate of change (rate of change per unit time) in the time before a collision may occur between the vehicle 10 or 10A and the right-in-front vehicle 302a is smaller than a predetermined value.

Alternatively, it may be determined whether or not a diagonally front vehicle 302b is driving at a predetermined velocity Vref or higher.

(C3-2. Driving State of Front Vehicle 302)

In the above-described embodiments, a sign icon 52 (see FIG. 3) is used as first sign information Is1 based on a surrounding image Imc (front image) to be supplied to a driver. However, the first sign information Is1 may be supplied to a driver by using another means. For example, a road sign 300 may be highlighted in a head-up display (HUD) (highlighted frame corresponding to a road sign 300, for example, may be displayed). In this case, a determination as to whether or not a road sign 300 will be highlighted may be made in accordance with the driving state of a front vehicle 302. Alternatively, sound may be output to inform a driver of the presence of a road sign 300. In this case, a determination as to whether or not sound will be output to inform a driver of the presence of a road sign 300 may be made in accordance with the driving state of a front vehicle 302.

(C3-3. Road Sign 300)

In the first embodiment, as road signs 300, a speed limit sign 300a (FIG. 2), a stop sign 300b (FIG. 4), and a no-entry sign 300c (FIG. 5) are used. However, other road signs 300 may be used as road signs 300 supplied to drivers as sign information Is by using a device, such as the MID 26. For example, road signs 300 may include (a) a sign indicating a bus only lane, (b) a sign indicating an electric vehicle only lane, (c) a sign indicating a lane only for vehicles having license plates of particular numbers (for example, the last number of a license plate is an odd number), and (d) a sign indicating a school zone (no entry for vehicles at a particular time range for schoolchildren).

What is claimed is:

1. A road sign information display system in a vehicle comprising:
   a front surround view camera installed in a host vehicle and configured to obtain an image of surroundings in front of the host vehicle;
   a sign recognition device that recognizes a road sign from the image to provide first sign information representing the recognized road sign, the road sign being a stop sign or a do-not-enter sign;
   a sign information display device that displays the first sign information to a driver in the host vehicle;
   a display control device that controls the sign information display device; and
   a front vehicle recognition device that recognizes a front vehicle running ahead of the host vehicle in a driving lane in which the host vehicle is running or in an adjacent driving lane so as to provide information relating to movement of the front vehicle,
   wherein the display control device is configured to determine whether or not the sign information display device is allowed to display the first sign information, on the basis of the information relating to the movement of the front vehicle,
   wherein the information relating to the movement of the front vehicle comprises at least a velocity of the front vehicle,
   wherein the display control device is further configured to detect the velocity of the front vehicle and a velocity of the host vehicle,
   obtain a predetermined threshold velocity by multiplying the velocity of the host vehicle by 0.6 to 0.9, and
   compare the velocity of the front vehicle and the predetermined threshold velocity, and
   wherein the display control device does not allow the sign information display device to display the first sign information when the velocity of the front vehicle is higher than the predetermined threshold velocity.

2. A sign information display system in a vehicle, comprising:
   a front surround view camera installed in a host vehicle and configured to obtain an image of surroundings in front of the host vehicle;
   a sign recognition device that recognizes a road sign from the image to provide first sign information representing the recognized road sign, the road sign being a stop sign or a do-not-enter sign;
   a sign information display device that displays the first sign information to a driver in the host vehicle;
   a display control device that controls the sign information display device; and
   a front vehicle recognition device that recognizes a front vehicle running ahead of the host vehicle in a driving lane in which the host vehicle is running or in an adjacent driving lane so as to provide information relating to movement of the front vehicle,
   wherein the display control device is configured to determine whether or not the sign information display device is allowed to display the first sign information, on the basis of the information relating to the movement of the front vehicle,
   wherein the information relating to the movement of the front vehicle comprises a deceleration rate of velocity of the front vehicle,
   wherein the display control device is further configured to detect the deceleration rate of the velocity of the front vehicle, and
   compare the deceleration rate of the velocity of the front vehicle and a predetermined threshold rate, and
   wherein the display control device does not allow the sign information display device to display the first sign information when the deceleration rate of the velocity of the front vehicle is lower than the predetermined threshold rate.

3. The sign information display system according to claim 1, wherein the front vehicle recognition device is further configured to provide information relating to a lane location at which the front vehicle is running, and the display control device does not allow the sign information display device to display the first sign information when the front vehicle recognition device recognizes that the front vehicle is in the adjacent driving lane.

4. The sign information display system according to claim 1, wherein the display control device is further configured to detect whether the host vehicle is turning right or left or whether the host vehicle is entering a side road, the display control device allows the sign information display device to display the first sign information when the tuning of the host vehicle or the entering of the host vehicle into the side road is detected.

5. The sign information display system according to claim 1, further comprising:
   a vehicle position detection device that detects a current position of the host vehicle; and
   a map database containing map information,
   wherein the display control device is configured to obtain second sign information from the map information relating to the current position of the host vehicle and to compare the first sign information obtained through the front surround view camera with the corresponding second sign information, and the display control device selects either of the first sign information or the second sign information to display in the sign information display device, on the basis of a comparison result.

* * * * *

UNITED STATES PATENT AND TRADEMARK OFFICE
CERTIFICATE OF CORRECTION

PATENT NO.         : 10,336,190 B2
APPLICATION NO.    : 14/940372
DATED              : July 2, 2019
INVENTOR(S)        : Yuji Yokochi et al.

Page 1 of 1

It is certified that error appears in the above-identified patent and that said Letters Patent is hereby corrected as shown below:

On the Title Page

INVENTOR should read: Izumi Takatsudo

Signed and Sealed this
Twenty-sixth Day of November, 2019

Andrei Iancu
*Director of the United States Patent and Trademark Office*